United States Patent
Olson

(10) Patent No.: US 7,006,075 B1
(45) Date of Patent: *Feb. 28, 2006

(54) ERGONOMIC COMPUTER MOUSE

(75) Inventor: Joshua Olson, Boise, ID (US)

(73) Assignee: Micron Technology Inc., Boise, ID (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/966,761

(22) Filed: Nov. 10, 1997

(51) Int. Cl.
  G09G 5/00 (2006.01)
  G09G 5/08 (2006.01)

(52) U.S. Cl. ..................... 345/163; 345/156

(58) Field of Classification Search ........ 345/156–169; D14/114–115; 248/118–121, 918–920; 361/380–381; 200/5 R
See application file for complete search history.

(56) References Cited

U.S. PATENT DOCUMENTS

| | | | |
|---|---|---|---|
| 3,892,963 A | 7/1975 | Hawley et al. | 250/231 R |
| D281,164 S | 10/1985 | Kim | D14/114 |
| 4,613,853 A | 9/1986 | Hosogoe et al. | 345/164 |
| D288,569 S | 3/1987 | Ida | D14/114 |
| RE32,632 E | 3/1988 | Atkinson | |
| 4,806,917 A | 2/1989 | Hosogoe | 345/164 |
| D300,324 S | 3/1989 | Akagi et al. | D14/114 |
| 4,847,484 A | 7/1989 | Kikuchi | 250/221 |
| 4,917,516 A * | 4/1990 | Retter | 400/489 |
| 5,001,467 A | 3/1991 | Chien | 340/10 |
| 5,095,303 A | 3/1992 | Clark et al. | 340/710 |
| 5,122,786 A * | 6/1992 | Rader | 340/711 |
| 5,157,381 A * | 10/1992 | Cheng | 340/710 |
| D335,875 S * | 5/1993 | Chen | D14/100 |
| 5,260,696 A | 11/1993 | Maynard, Jr. | 345/163 |
| 5,340,067 A | 8/1994 | Martin et al. | 248/918 |
| 5,349,371 A | 9/1994 | Fong | 345/166 |
| 5,355,147 A | 10/1994 | Lear | |
| 5,367,631 A | 11/1994 | Levy | |
| D354,746 S | 1/1995 | Colani et al. | D14/114 |
| 5,414,445 A * | 5/1995 | Kaneko et al. | 345/163 |
| D359,277 S | 6/1995 | Dann et al. | D14/114 |
| 5,538,431 A * | 7/1996 | Dempster | 434/227 |
| D373,999 S * | 9/1996 | Staats | D14/114 |
| 5,563,629 A | 10/1996 | Caprara | |
| 5,570,112 A * | 10/1996 | Robinson | 345/163 |
| 5,576,733 A | 11/1996 | Lo | |
| 5,581,277 A * | 12/1996 | Tajiri | 345/163 |
| 5,626,427 A | 5/1997 | Klauber et al. | |
| 5,648,798 A | 7/1997 | Hamling | |
| 5,726,683 A * | 3/1998 | Goldstein | 345/168 |
| D397,330 S | 8/1998 | Lister-Myers et al. | D14/114 |
| 5,841,425 A | 11/1998 | Zenz, Sr. | 345/163 |

(Continued)

OTHER PUBLICATIONS

U.S. Appl. No. 08/966,760, filed Nov. 10, 1997, Inventor: Joshua L. Olson.

Primary Examiner—Vijay Shankar
(74) Attorney, Agent, or Firm—Knobbe Martens Olson & Bear, LLP

(57) ABSTRACT

An ergonomic computer mouse is provided. The mouse has at least one signaling device that is positioned to accommodate a user's fingers when they are in a relaxed, nonextended state and the user's hand is resting on the mouse. The user may actuate a signaling device by exerting pressure on the signaling device in an upward direction, toward the rear of the mouse, or both. The mouse thus reduces fatigue on the user's hand and arm.

26 Claims, 3 Drawing Sheets

U.S. PATENT DOCUMENTS

| | | | |
|---|---|---|---|
| 5,894,302 A | * | 4/1999 | Scenna et al. ............... 345/163 |
| 5,982,352 A | * | 11/1999 | Pryor ......................... 345/156 |
| 6,078,549 A | * | 6/2000 | Wyatt et al. ................... 368/10 |
| 6,781,573 B1 | * | 8/2004 | Honma et al. .............. 345/163 |

* cited by examiner

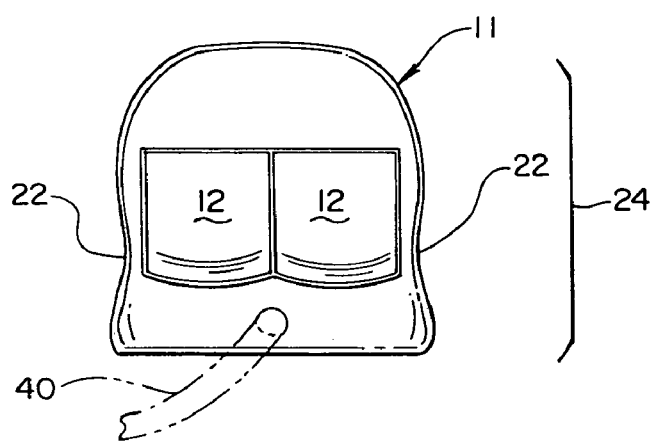
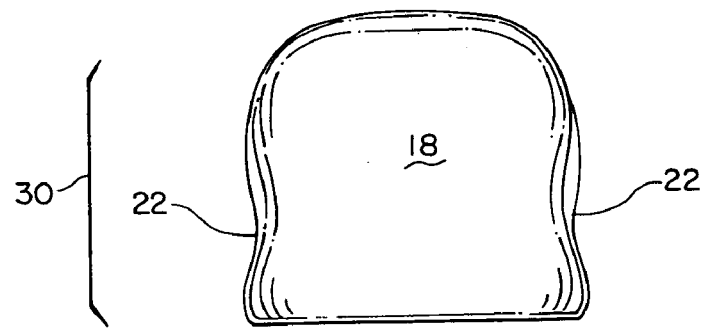

ERGONOMIC COMPUTER MOUSE

FIELD OF THE INVENTION

The present invention relates to a computer cursor control device, commonly known and referred to herein as a "mouse." More particularly, it relates to an ergonomic computer mouse that increases the user's comfort and control.

BACKGROUND OF THE INVENTION

The computer mouse has become a nearly universal device for interfacing with a computer. The mouse permits a computer user to position and move a cursor on a computer screen without having to use a keyboard. The cursor can take any form, such as an arrow, vertical line, or paintbrush—any token to aid the user in interfacing with a computer by controlling the position of the token on the computer screen. The cursor is controlled by moving a mouse containing a movement sensor across a surface. The movement sensor may be provided in the form of a ball mounted to revolve within a housing; the ball contacts and rolls on a surface as the mouse is moved, as directed by the user's hand motion. Sensors detect the ball's movement and generate electronic signals that enable the computer to convert the ball's movement into cursor control.

The mouse also permits the user to interface with the computer through a selectively actuated signaling device. The signaling device, which may be a button mounted on the mouse housing that is pressed or a pad touched by the user's fingertip(s), permits the user to perform a variety of functions (sometimes in connection with the movement sensor), including placing a cursor, sweeping a defined area of text or space within an area defined by cursor movement, and operating pull-down menus.

Current mouse designs have drawbacks that render them somewhat user unfriendly. First, current mice have their signaling devices located generally on the top face of the mouse housing. Having the signaling device on the top of the mouse housing means the user cannot rest his or her fingers on the mouse without risking inadvertently operating the signaling device. Instead, the user must at all times, except when operating the signaling device, hold his or her fingers in an extended, slightly tensed position that keeps finger pressure off the mouse's signaling device. This tensed position can lead to fatigue in the user's hand, arm, and wrist, and to symptoms associated with repetitive stress injuries (also known as repetitive strain injuries or carpal tunnel syndrome).

Current mouse designs also have the movement sensor positioned in the middle or toward the front of the mouse housing. The movement sensor thus is located below the fingers, knuckles, or center of the palm of the user's hand. This positioning encourages the user to move the mouse by twisting his or her wrist, because (due to the distance between the wrist joint and movement sensor) such twisting or side-to-side flexing can be used to control cursor movement. This wrist-based cursor control is less favorable from an ergonomic standpoint than lower-arm movement, because it can lead to wrist and arm fatigue and to wrist joint symptoms associated with repetitive stress injuries.

In addition, some current mouse housing designs are not shaped to fit comfortably in the user's hand. Their top surfaces often are flat, or have two planar surfaces joined at an angle. In contrast, the human hand, when in its relaxed state, tends to be curved, with an apex at the knuckles. Current designs also often make no allowance for the natural position of the human thumb, which, in its relaxed state, tends to curve or point slightly inward, toward the palm.

Recently, efforts have been made to design mice that address some of the problems noted above. Hamling, U.S. Pat. No. 5,648,798, issued Jul. 15, 1997, and Lo, U.S. Pat. No. 5,576,733, issued Nov. 19, 1996, disclose mice in which an attempt has been made to locate the signaling devices in a position that decreases the need for the user to hold his or her fingers in an extended position. These mice only partially address this problem, however, and they also have several disadvantages. Because these mice are generally rounded, the user's fingers are only somewhat relaxed when the mice are used, and the positioning of the signaling devices on these mice only partially lessens the strain on the user's fingers. In addition, the mice of Hamling and Lo position the user's hand so that his or her palm is generally perpendicular to the work surface. Thus, the signaling devices are actuated by moving the fingertips in a plane that is generally perpendicular to the work surface. Most users are unaccustomed to such an orientation. Hamling's and Lo's vertical orientation also causes the user to position his or her wrist on the work surface, resulting in uncomfortable, awkward pressure on the wrist bone. Because the user cannot rest his or her wrist on these mice, he or she also must exert an upward force on his or her hand and arm. Finally, Hamling and Lo do not disclose positioning the movement sensor to discourage wrist motion, and thus do not address the wrist-flexing problem that is discussed herein and addressed by some embodiments of the present invention.

There is an unmet need for a more ergonomic computer mouse. Such an ergonomic mouse preferably would permit the user to operate the signaling device with his or her fingers in a relaxed, nonextended position. It further would be desirable for such a mouse to encourage cursor control through whole-arm movement, rather than wrist-twisting motions. It also would be desirable for such a mouse to be comfortable to hold, move, and actuate.

SUMMARY OF THE INVENTION

One embodiment of the present invention relates to an ergonomic computer mouse with a front end and a rear end, both part of a housing that fits within a user's hand. At the front end, the mouse contains at least one signaling device. The mouse's front-to-back length is selected and the signaling device is positioned so that the signaling device is adjacent the tips of the user's fingers when they are in a relaxed, extended state and the palm of the user's hand is resting on the mouse. The user's fingers thus naturally wrap around the front of the mouse. In some embodiments, the mouse is wider than it is tall. The signaling device may have a generally vertical, fingertip-receiving actuation surface, the lower portion of which may be sloped toward the mouse's rear end.

The mouse housing contains a movement sensor located on its bottom surface, toward its rear end. The movement sensor is positioned so that, when the mouse is used, the movement sensor is located closer to the user's wrist joint than the user's knuckles, preferably generally under the user's wrist joint. The mouse's top surface is generally rounded, with an apex positioned to be located generally under the user's knuckles when the mouse is in use. The mouse's sides may be curved inward to accommodate the user's thumb in a relaxed state.

An advantage of some embodiments of the present invention is that they may be operated by the user when the user's fingers are in a relaxed, nonextended state. A further advantage of other embodiments of the invention is that the movement sensor is located toward or adjacent to the mouse's rear end, thus being near the wrist joint to encourage arm movement and discourage wrist flexing to control the cursor. Another advantage of certain embodiments is that the top and side surfaces are shaped to accommodate the human hand in a relaxed position.

These and other advantages will become apparent with reference to the drawings, the description of the preferred embodiments, and the appended claims.

BRIEF DESCRIPTION OF THE DRAWINGS

FIG. 6 is a front elevational view of the embodiment of FIG. 1.

FIG. 7 is a rear elevational view of the embodiment of FIG. 1.

DETAILED DESCRIPTION OF THE INVENTION

Figure 1:
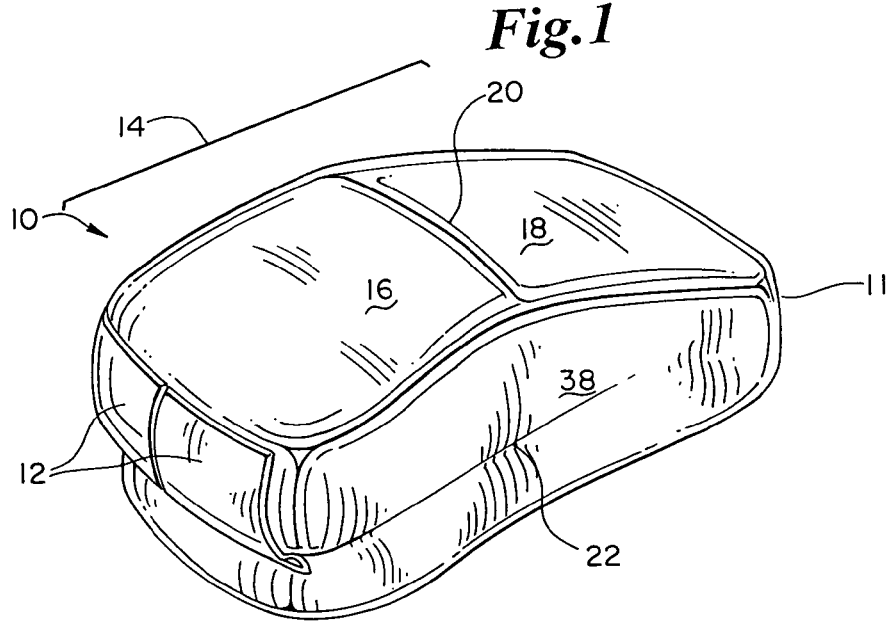
FIG. 1 is an isometric view of one embodiment of the present invention, viewed from its top and front.

FIG. 1 depicts the ergonomic mouse 10 of one embodiment of the present invention. The exterior of the mouse 10 is a housing 11 with a generally curved top surface 14, a front face 24, and a rear face 30. Although the front face 24 of the mouse 10 as shown has two signaling devices 12, one, two, or more signaling devices 12 are acceptable. Furthermore, although the signaling devices 12 are depicted as buttons actuated by depressing them into the housing 11, any pressure- or contact-sensitive signaling device 12 may be utilized.

FIG. 1 also depicts the top surface 14 of the mouse 10. The top surface 14 may have a gently curved upper top surface 16 and a gently curved lower top surface 18 that are joined and positioned to fit comfortably into the user's hand. The top surface 14 may have an apex 20 at the joining line between the upper top surface 16 and lower top surface 18 that is positioned to fit under the user's knuckles. Although the top surface 14 of the mouse 10 is shown in FIG. 1 with an apex 20, any suitable generally curved surface conforming closely to the interior of a relaxed hand will work. FIG. 1 also depicts left side 38 with a thumb groove 22 that is positioned to accommodate a right-handed user's thumb in a relaxed state.

Figure 2:
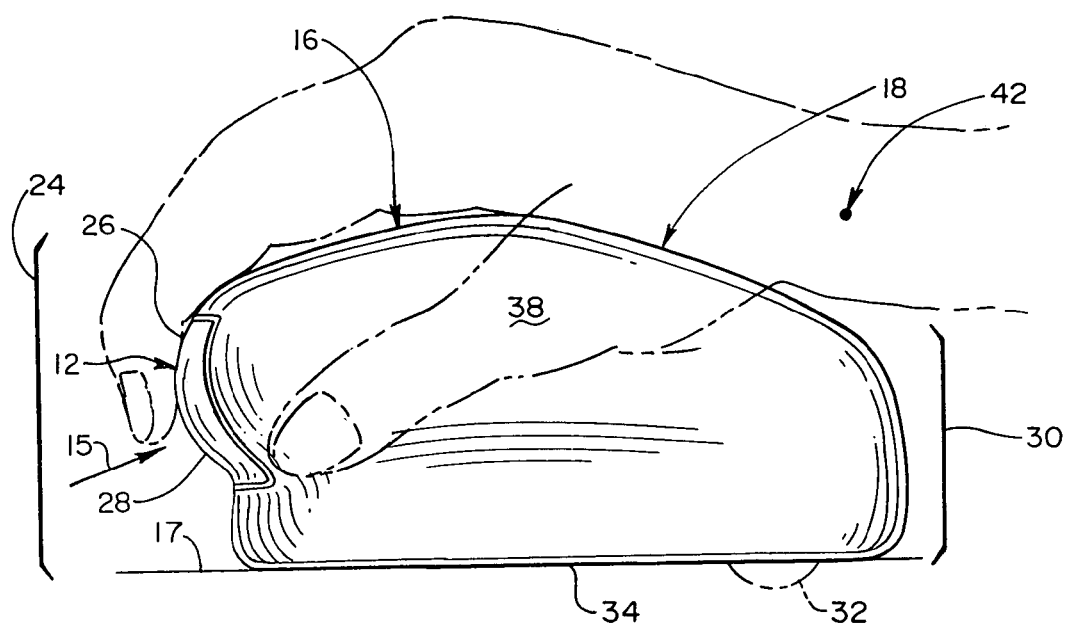
FIG. 2 is a side elevational view of the embodiment of FIG. 1 with a user's hand shown in phantom.

As can best be seen in FIG. 2, each signaling device 12 may be located on the mouse's front face 24. As depicted, the front face 24 of the mouse 10 is curved, but any suitable shape will work. In the embodiment depicted, the user's fingers will curl around the front face 24 of the mouse 10. The actuation surface of signaling device 12 may have an upper segment 26, a lower segment 28, or (as shown) both. To actuate the signaling device 12, the user need only slightly close the finger(s) of his or her hand in a natural manner, thus exerting against the signaling device 12 fingertip pressure that is directed upward, rearward, or both (see arrow 15). As can be seen, the upper segment 26 is positioned so that, to actuate the signaling device 12, the user exerts pressure on the upper segment 26 that is directed generally toward the rear face 30 of the mouse 10. In this embodiment, the signaling device 12 may be actuated by moving the fingertips in a direction that is generally parallel to the work surface 17 on which the mouse 10 moves. Although the upper segment 26 is generally vertically oriented, the upper segment 26 may be configured so that an imaginary plane tangent to the upper segment 26 may be oriented so as to have an angle of plus or minus 45° relative to a plane that is perpendicular to the bottom surface 34 of the mouse 10. The lower segment 28 is positioned so that, to actuate the signaling device 12, the user exerts pressure on the lower segment 28 that is directed both rearward and somewhat upward, toward the top surface 14 of the mouse 10. The lower segment 28 thus slopes downwardly and toward the rear face 30 of the mouse 10. Nevertheless, the lower segment 28 may be oriented to have a wide range of angular orientations with respect to the bottom surface 34 of the mouse 10. Accordingly, for any point on the lower segment 28, a vector that extends in a direction normal to an imaginary plane that is tangent to the lower segment 28 at that point will extend toward the work surface 17. The lower segment 28 thus is oriented so that such a vector has a vertical component that is directed toward the work surface 17, and a horizontal component that may be directed either toward or away from the rear face 30 of the mouse 10. The lower segment 28 also may be positioned generally parallel to the bottom surface 34 of the mouse 10.

The distance between the front face 24 and the rear face 30 of the mouse 10 is selected such that the mouse 10 is easily enclosed in a relaxed hand; that is, the user's fingertips are in contact with the signaling device(s) 12; the fingers, knuckles, and palm curve over upper top surface 16 and lower top surface 18; and the fleshy lower part of the palm rests against the rear face 30. The movement sensor is spaced from the front face 24 of the mouse 10 by a distance that is generally equal to that between a hand's wrist joint and fingertips when the hand is in a relaxed, nonextended state. If desired, the mouse 10 may be made in different sizes to provide this fit for different size hands. As depicted in FIG. 2, the user's wrist joint pivot point 42 is located between the movement sensor 32 and the rear face 30 of the mouse 10. Any mouse, even if shorter or longer than the user's hand, that permits the movement sensor 32 to be positioned so that the movement sensor 32 is closer to the user's wrist joint than it is to the user's knuckles aids the goal of encouraging arm motion rather than wrist flexing. The movement sensor 32 may be under or only slightly displaced from the user's wrist joint.

The embodiments of the present invention are intended to accommodate any size hand, adult or child. The embodiment depicted herein is intended to accommodate North American adult users within a defined range of hand size that is bounded on the smaller end by a 5th percentile female hand and on the larger end by a 95th percentile male hand. Thus, the embodiment depicted herein is intended to accommodate 95 percent of adult mouse users. Other users easily may be accommodated with larger or smaller embodiments.

Although both the upper segment 26 and the lower segment 28 are shown, some embodiments of the invention have one or the other or both. In addition, the two segments, when both are used, may be located in any suitable arrangement, with the upper segment 26 located below the lower segment 28 or with the "upper" and "lower" segments 26, 28 positioned side-by-side. By having either or both of the upper segment 26 and the lower segment 28, the mouse will substantially accommodate the user's fingers in their relaxed and nonextended state, and the user will be able to actuate the signaling device 12 simply by closing his or her hand in a natural manner, thus exerting pressure on the signaling device 12 as described above. It should be noted that the signaling device 12 may be sized to accommodate one or more fingers. By accommodating the user's fingers in their relaxed, nonextended state, embodiments of the present invention decrease fatigue in the user's hand, thereby helping to avoid or minimize repetitive stress injuries, make the mouse more comfortable to use, and facilitate user productivity. The location the signaling device(s) 12 may ensure that the user's hand will be positioned properly on top of the mouse 10, i.e., with the user's wrist located substantially over the rear face 30 of the mouse 10.

Figure 3:
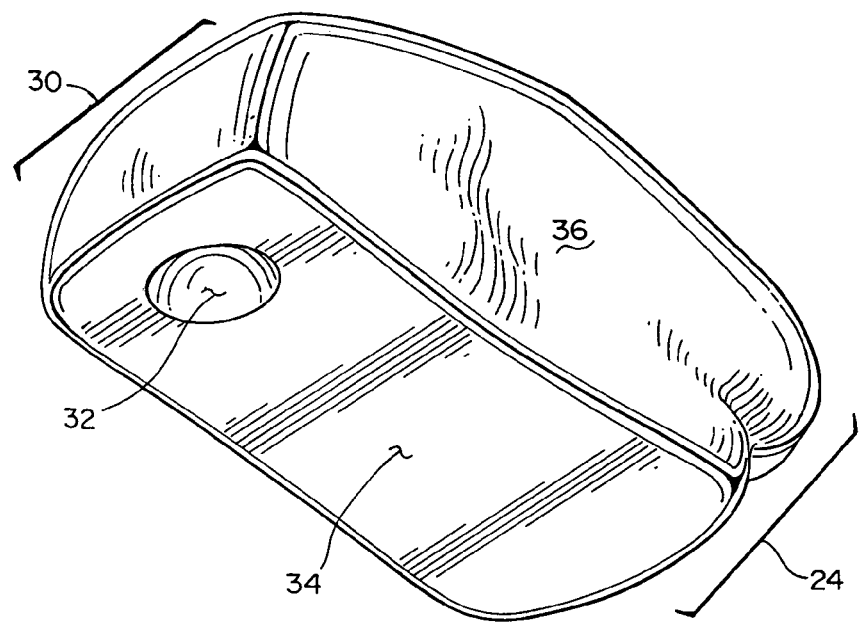
FIG. 3 is an isometric view of the embodiment of FIG. 1, viewed from its bottom and rear.

FIG. 3 depicts the bottom of the mouse 10. From this angle it can be seen that the movement sensor 32 of the mouse 10 is located in the bottom surface 34 of the mouse 10, substantially equidistant from the sides 36, 38. In particular, it is located adjacent the rear face 30 of the mouse 10. In the embodiment depicted, the movement sensor 32 will be located closer to the rear face 30 than to the front face 24 of the mouse 10, i.e., in the rear half (50 percent) of the mouse 10, as measured by the distance between front face 34 and rear face 30. Preferably, the movement sensor 32 will be located in the rear third (33 percent) of the mouse 10, or alternatively in the rear fourth (25 percent) or fifth (20 percent) of the mouse. As shown, the movement sensor 32 is a standard mouse ball, mounted for free revolution in contact with internal rollers. However, any suitable movement sensor 32 will work, and the specific type of movement sensor 32 employed is not important. Moreover, the movement sensor 32 may detect movement in either two or three dimensions, depending on its structure and the software being used.

The placement of the movement sensor 32 toward or adjacent to the rear of the mouse 10 is intended to reduce cursor control from a user's wrist-flexing movement, a principal cause of repetitive stress injuries; it also encourages cursor control from movement of the user's arm. This placement, together with selecting a suitable distance between the front and rear faces 24, 30 of the mouse 10, causes the movement sensor 32 to be positioned so that it is closer to the user's wrist joint than the user's knuckles, and preferably adjacent the user's wrist joint. The positioning of the movement sensor 32 near the wrist joint thus encourages more ergonomically proper techniques, decreases user fatigue and susceptibility to repetitive stress injuries, and facilitates user comfort and productivity.

Figure 4:
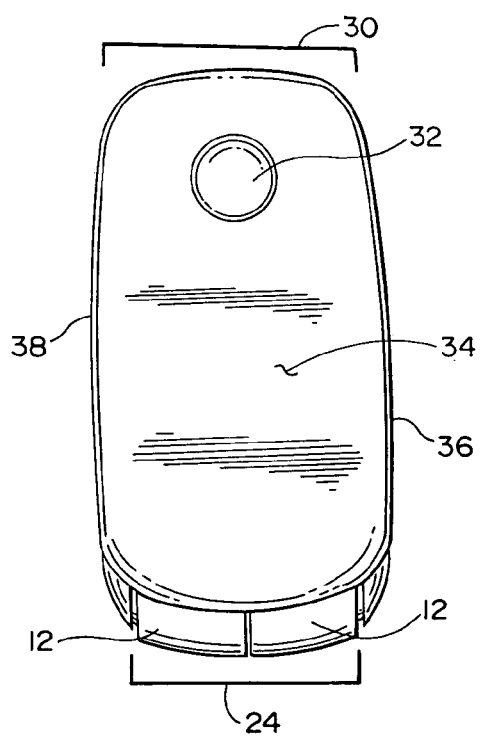
FIG. 4 is a bottom elevational view of the embodiment of FIG. 1.

As can be seen in FIG. 4, the movement sensor 32 may be located equidistant from the sides 36, 38 of the mouse. FIG. 4 also shows that the lower segment 28 of the signaling device 12 extends toward the bottom surface 34 and rear face 30 of the mouse 10.

Figure 5:
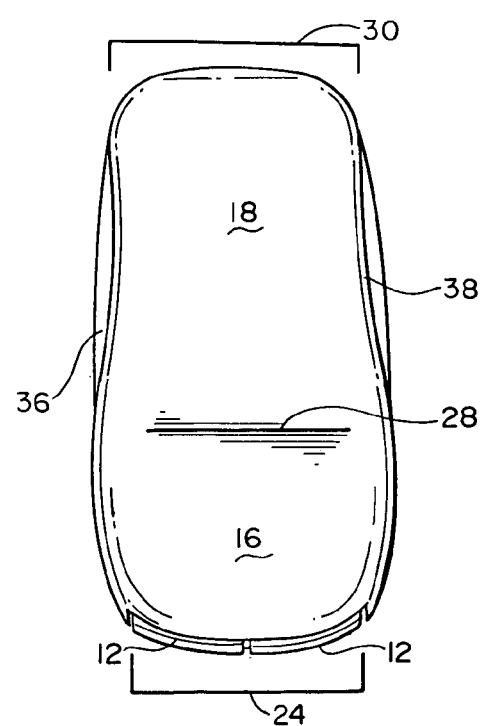
FIG. 5 is a top elevational view of the embodiment of FIG. 1.

As depicted in FIG. 2, the upper segment 26 of the signaling device 12 does not extend above the top surface 14 of the mouse 10, thus ensuring that the user may relax his or her fingers without inadvertently engaging the signaling device 12. FIGS. 2 and 5 also show that the thumb groove 22 is an indentation both horizontally and vertically, so that it resembles an hour-glass. As depicted, the mouse 10 is suitable for both left- and right-handed users. Nevertheless, it is contemplated that assymetrical modifications to the housing 11 of the mouse 10 may be made so that the mouse 10 is more specifically tailored to a left- or a right-handed user. It further is contemplated that the mouse 10 may be provided in different sizes for different hand sizes.

FIG. 6 shows the thumb grooves 22 viewed by looking at the front face 24 of the mouse 10. The mouse 10 may be physically connected to a computer by a cable 40 (shown in phantom) that extends from the front face 24 of the mouse 10, or a cable that extends from any location on the mouse 10. An infrared, radio frequency, or other wireless communication protocol also may be used. FIG. 7 depicts the rear face 30 of the mouse 10, and provides another view of the thumb grooves 22.

The use of the mouse 10 will now be described. To use the mouse 10, the user grasps the mouse 10 with his or her hand resting on the top surface 14 of the mouse 10, with the palm on the lower top surface 18 and the fingers on the upper top surface 16. The user's knuckles will be positioned generally above the apex 20. The ends of the user's fingers will extend around to the front face 24 to reach the signaling devices 12 in a natural, nonextended state. This positioning also encourages the user to locate his or her wrist generally above the rear face 30 of the mouse 10, and thus generally adjacent to and over the movement sensor 32. The user's thumb comfortably will fit into a thumb groove 22. To move the mouse 10 easily, the user must move his or her forearm, because wrist movement alone will provide only a small amount of cursor control. Wrist fatigue thus is reduced, and the advantages discussed above are provided. To actuate the signaling devices 12, the user need only slightly pull his or her fingers inward, pressing against an upper segment 26 of the signaling device 12, or exerting upward and rearward pressure against a lower segment 28 of the signaling device 12, or both. This essentially natural, minimal movement reduces user fatigue, and also provides the advantages discussed above.

Although descriptions of the preferred embodiments have been presented, it is contemplated that various changes may be made. Accordingly, it is intended that the scope of the invention not be limited strictly to the descriptions of the preferred embodiments.

What is claimed is:

1. A computer mouse comprising a housing with at least one signaling device positioned thereon to be adjacent the tips of a user's fingers when they are in a relaxed nonextended state and the palm of the user's hand is resting on said mouse housing and generally parallel to a work surface that supports said mouse, wherein said at least one signaling device is configured to be actuated by pressure exerted at least partially in a direction that is upward with respect to the work surface wherein the housing has a rear face and said at least one signaling device has a segment oriented to have a normal vector with a vertical component that extends toward a work surface and a horizontal component that extends toward the rear face of the mouse housing.

2. A computer mouse comprising a housing with at least one signaling device positioned thereon to be adjacent the tips of a user's fingers when they are in a relaxed nonextended state and the palm of the user's hand is resting on said mouse housing and generally parallel to a work surface that supports said mouse, wherein said at least one signaling device may be actuated by pressure exerted at least partially in a direction that is upward with respect to the work surface, wherein the housing has a bottom surface and said at least one signaling device has a segment oriented to have a normal vector with a vertical component that is directed toward the bottom surface of said mouse housing.

3. A computer mouse comprising a housing with at least one signaling device positioned thereon to be adjacent the tips of a user's fingers when they are in a relaxed nonextended state and the palm of the user's hand is resting on said mouse housing and generally parallel to a work surface that supports said mouse, wherein said at least one signaling device is configured to be actuated by pressure exerted at least partially in a direction that is vertically upward with respect to the work surface.

4. The computer mouse of claim 3, wherein the housing further comprises a curved front face.

5. The computer mouse of claim 4, wherein said at least one signaling device is positioned on said curved front face.

6. The computer mouse of claim 3, wherein the housing has a front face and said at least one signaling device is positioned on the front face of said mouse housing.

7. The computer mouse of claim 3, 4, 5 or 6, wherein the housing has a rear face and said at least one signaling device is configured to be actuated by pressure exerted generally toward the rear face of the mouse housing.

8. The computer mouse of claim 7, wherein the housing has a bottom surface and said at least one signaling device has a segment that is generally vertical with respect to the bottom surface of said mouse housing.

9. The computer mouse of claim 3, wherein the housing has a bottom surface and said at least one signaling device has a segment that is positioned generally parallel to the bottom surface and said segment faces the bottom surface.

10. The computer mouse of claim 3 or 4, wherein the housing further comprises a generally curved top surface, whereby said top surface is adapted to fit a user's hand.

11. The computer mouse of claim 10, wherein said top surface has an apex.

12. The computer mouse of claim 3 or 4, wherein the housing further comprises a side surface with at least one thumb groove therein.

13. A computer mouse comprising a housing with a curved front face and at least one signaling device located generally on said front face, wherein said at least one signaling device is configured to be actuated by pressure exerted at least partially in a direction that is vertically upward with respect to a work surface that supports the mouse.

14. The computer mouse of claim 13, wherein said at least one signaling device has a segment that is oriented to be generally perpendicular to the work surface that supports said mouse.

15. A computer mouse comprising a housing with a curved front face and at least one signaling device located generally on said front face, wherein said at least one signaling device is configured to be actuated by pressure exerted at least partially in a direction that is upward with respect to a work surface that supports the mouse, wherein the housing has a bottom surface and said at least one signaling device has a segment oriented to have a normal vector with a horizontal component and said segment faces the bottom surface of said housing.

16. The computer mouse of claim 15, wherein said housing has a generally curved top surface.

17. The computer mouse of claim 16, wherein said top surface has an upper top surface and a lower top surface.

18. The computer mouse of claim 17, wherein said top surface has an apex.

19. The computer mouse of claim 15, wherein said housing has two sides and at least one thumb groove in a side.

20. A computer mouse comprising at least one signaling device positioned to accommodate a user's fingers when they are in a relaxed, nonextended state and the user's hand is supported by a top surface of the mouse, wherein said at least one signaling device is configured to be actuated by pressure exerted at least partially in a direction that is vertically upward with respect to the work surface that supports the mouse.

21. The computer mouse of claim 20, wherein said mouse is sized to accommodate a user's hand that is not smaller than the 5th percentile female hand and not larger than the 95th percentile male hand.

22. The computer mouse of claim 21, wherein said top surface is generally parallel to the work surface that supports said mouse.

23. The computer mouse of claim 21 or 22, wherein the user's fingertips move in a direction that is generally parallel to the work surface supporting said mouse when said at least one signaling device is actuated.

24. The computer mouse of claim 23, wherein said mouse is wider than it is tall.

25. The computer mouse of claim 23, wherein said at least one signaling device contains a segment that slopes toward a rear end of said mouse.

26. The computer mouse of claim 25, wherein said at least one signaling device is actuated by a force exerted generally toward said rear end of said mouse.

* * * * *